United States Patent
Krueger et al.

(10) Patent No.: US 7,724,021 B2
(45) Date of Patent: May 25, 2010

(54) METHOD AND DEVICE FOR PROGRAMMABLE POWER SUPPLY WITH CONFIGURABLE RESTRICTIONS

(75) Inventors: Martin Krueger, Munich (DE); Erwin Huber, Munich (DE); Jens Barrenscheen, Munich (DE)

(73) Assignee: Infineon Technologies Austria AG, Villach (AT)

( * ) Notice: Subject to any disclaimer, the term of this patent is extended or adjusted under 35 U.S.C. 154(b) by 83 days.

(21) Appl. No.: 12/194,955

(22) Filed: Aug. 20, 2008

(65) Prior Publication Data

US 2010/0045336 A1    Feb. 25, 2010

(51) Int. Cl.
*H03K 19/00* (2006.01)

(52) U.S. Cl. .................. 326/8; 326/9; 326/37; 326/38
(58) Field of Classification Search .................. None
See application file for complete search history.

(56) References Cited

U.S. PATENT DOCUMENTS

| 7,394,445 B2 * | 7/2008 | Chapuis et al. ............. 345/89 |
| 2008/0022138 A1 * | 1/2008 | Huang et al. ............. 713/300 |

* cited by examiner

*Primary Examiner*—Anh Q Tran
(74) *Attorney, Agent, or Firm*—Slater & Matsil, L.L.P.

(57) ABSTRACT

The invention involves a programmable power supply device with configurable restrictions to the programmability of the power supply device, wherein the programmable power supply device comprises a number of freeze/programmability levels, each freeze/programmability defining a dedicated access restriction to the programmability of the power supply device.

27 Claims, 1 Drawing Sheet

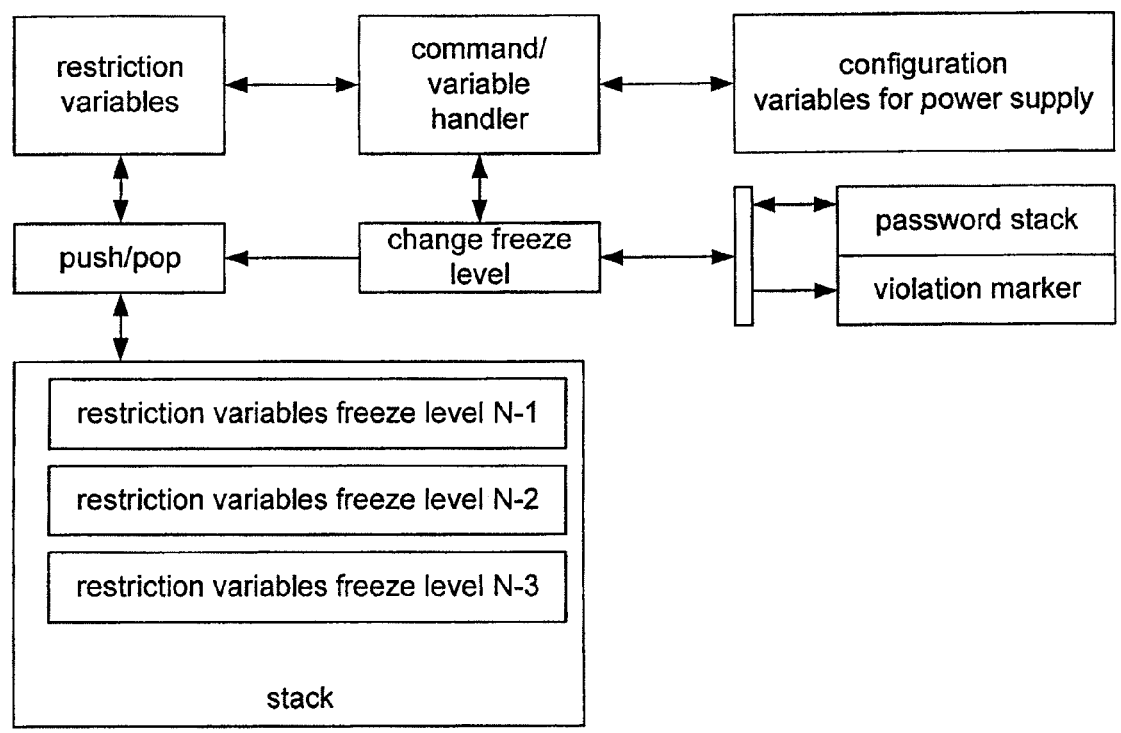

METHOD AND DEVICE FOR PROGRAMMABLE POWER SUPPLY WITH CONFIGURABLE RESTRICTIONS

TECHNICAL FIELD

The present invention refers to a programmable power supply device with configurable restrictions and to a method to operate a programmable power supply device with configurable restrictions. In general terms, the present invention is directed to a method and apparatus to simplify control and programming of power management devices or power supply devices. In the following, the expression power supply device refers to power management devices, power supply devices and to power supply system host controllers in general as well.

BACKGROUND

For simplification of the control and the programming of power supply devices, the so called power system management bus (PMBus) standard was defined. Known bus protocols, e.g., I²C or SMBus, allow the programming of a power management device by directly writing to internal registers of the device. Users interactively configuring such devices or writing software for power supply system host controllers need a lot of proprietary information about this devices as well as a deep insight knowledge on the function of their registers. For instance, the above mentioned known power system management bus standard PMBus provides a simple command language with standardized configuration and interaction commands. Thus, the user can concentrate more on the power system management concept itself and becomes more independent from the internal device architecture.

The programmability of a power supply device is usually handled by an integrated circuit. This integrated circuit can be programmed during different stages of manufacturing or preparation. These stages of manufacturing can be, for example, at the chip manufacturer, the module manufacturer, the system manufacturer, and the end-user. During each stage certain restrictions should apply to the programmability to ensure safe operation of the power supply device on the one hand and to allow sufficient flexibility of the power supply device on the other hand. These restrictions can be different at each stage and should be defined by the previous stage.

BRIEF DESCRIPTION OF THE DRAWINGS

The FIGURE provides a block diagram to illustrate concepts of the present invention.

DETAILED DESCRIPTION OF ILLUSTRATIVE EMBODIMENTS

Programmable power supply devices can be programmed by a number of commands or instructions assembled in a program and/or written in registers of the programmable power supply device and executed by an integrated circuit controlling the power supply device.

A programmable power supply device may be provided with a configurable restriction to the programmability of the power supply device. The restriction may increase from stage to stage and may not be decreased without authorization. Removing restrictions of a programmable power supply device may be desirable in case of returned defective devices. Restrictions to the programmability of programmable power supply devices can be, for instance, a write protection to certain commands or variables, a limitation of the values of a command parameter or a variable, or reading protection.

The above mentioned known PMBus standard usually may comprise a so called WRITE_PROTECT command, that allows the selection of one of the following write protection modes:

all commands are write protected, except the command WRITE_PROTECT itself;

all commands are write protected, except for three commands, e.g., WRITE_PROTECT, OPERATION, and PAGE;

all commands are write protected, except for five commands, e.g., WRITE_PROTECT, OPERATION, PAGE (previously mentioned) as well as ON_OFF_CONFIG and VOUT_COMMAND; and no command is write protected.

These existing solutions do not provide a fine-granular protection mechanism for programmable power supply devices taking into consideration different parameters that have to be adapted from one manufacturing stage to another manufacturing stage, e.g., from the device manufacturer to the end customer or user. In known programmable power supply devices either a large amount of parameters can be modified, also unintentionally, or a very limited access is possible, which provides not enough flexibility. Furthermore, the existing solutions for programmable power supply devices do not imply range checks for operation parameters of the power supply device. This can lead to significant risks of destroying the complete programmable power supply system due to unintentionally programming of inappropriate parameters, e.g., too high parameter values or too low parameter values depending on the respective parameter.

Embodiments of the invention address the above mentioned problems by introducing a number of freeze levels or programmability levels in the programmable power supply device. According to an aspect of the present invention the configurable restriction of the power supply device comprises a number of freeze levels of programmability, such that each freeze/programmability level defines a predetermined access restriction to the programmability of the power supply device.

The use of several freeze/programmability levels in the operation of programmable power supply device may be liable to a hierarchical order. Furthermore, the manufacturing levels can be associated with certain freeze/programmability levels. Generally, a higher freeze/programmability level with respect to the hierarchical order may lead to a more restricted access to parameters of the programmable power supply device than in lower freeze/programmability level. Thus, for instance, the module manufacturer can adapt some parameters to module-specific requirements that can not be modified by the system manufacturer in the next stage. This may have also a comfortable effect for the system manufacturer with regard to warranty issues.

An example for a set of manufacturing levels which can be associated with certain freeze/programmability levels used according to the present invention can be as follows:

Chip Manufacturer Level:

In the integrated circuit chip manufacturer level no access restrictions may be installed to enable the chip manufacturer to program the chip in any respect to all intents and purposes. For instance, the chip can be programmed from the chip manufacturer by a faster access interface than the PMBus (power system management bus) and the chip manufacturer can access all information. This access may not be restricted by an authorization requirement, however this access may be marked. The chip manufacturer may program the access restrictions that are important for the integrated circuit chip and that can be relevant for all applications of the chip.

Module Manufacturer Level:

The module manufacturer integrates the integrated circuit chip into a module. The module manufacturer may have only access to the chip via PMBus (power system management bus) and may program the chip, but only within the access restrictions set by the chip manufacturer in the manufacturing level or freeze/programmability level before. The module manufacturer may tighten the restrictions and/or add further access restrictions that can be important for the safe operation of the module and can be relevant for all applications of the module.

System Manufacturer Level:

The system manufacturer integrates or installs the module into a system. Like the module manufacturer, the system manufacturer may have only PMBus access. The system manufacturer can program the integrated circuit chip in the module that is integrated or installed in the system, however only within the access restrictions set by the module manufacturer in the manufacturing level or freeze/programmability level before. The system manufacturer may tighten the access restrictions and/or add further access restrictions that may be important for the safe operation of the system and can be relevant for all application of this system.

"End-User" Level:

The end-user integrates the system into an application. It is fairly unusual that the power supply is programmed by the end-user. Nevertheless, in an embodiment of the present invention it may be possible for the end-user to program the host of the power supply device, and thus programming the integrated circuit chip via PMBus within the restrictions set by the system manufacturer in the manufacturing level or freeze/programmability level before. After the "End-user" level no further freeze/lock or access restriction is necessary or applicable.

If the integrated circuit chip comprises an error and this error may impact the functional operation by the end-user, the following exemplary return process according to the present invention can be performed:

The end-user returns the system to the system manufacturer.

The system manufacturer analyses the system. For some analysis the system manufacturer it may be necessary to enter the system manufacturer level. Therefore, the system manufacturer unfreezes or unlocks accesses to the system in the system manufacturer level for analysing purposes. The analysis may show that the error is either in the module or in the chip so that the module is returned to the module manufacturer.

The module manufacturer proceeds in a likely way as the system manufacturer. Hence, the module manufacturer analyses the system, and for some analysis methods the module manufacturer has to enter the module manufacturer level. Therefore, the module manufacturer unfreezes or unlocks accesses to the system in the module manufacturer level for analysing purposes. After unfreezing or unlocking and analysing the chip by the module manufacturer the chip may be returned to the chip manufacturer.

The chip manufacturer can unfreeze or unlock the device in the chip manufacturer level by his password and analyze the chip via PMBus. This can be allowed within a limited bandwidth, and whereas not all internal information can be readable. For a better access, e.g., a faster access to all information, the device manufacturer can analyze the chip by a fast access port (e.g., JTAG). Therefore, the fast access port has to be enabled, which might lead to a mark (see second marker described above). When an error is found in an integrated circuit chip, another chip sample can be returned to the module manufacturer, as the faulty chip is marked now.

In this embodiment four freeze levels or programmability levels of the programmable power supply device are provided. However, according to the present invention an arbitrary number of freeze/programmability levels can be provided.

According to an embodiment of the present invention the entering from a current freeze/programmability level to a higher freeze/programmability or to the next hierarchically higher freeze/programmability level may be possible only with an respective authorization. Alternatively, the entering from a current freeze/programmability level to a higher freeze/programmability or to the next higher freeze/programmability level may be possible without authorization. Moreover, it may be possible to enter from a current freeze/programmability level to a hierarchically lower freeze/programmability level or to the next lower freeze/programmability level either with authorization or without authorization.

According to another embodiment of the present invention the entering from a current freeze/programmability level to a higher or lower freeze/programmability level with authorization or without authorization may be indicated by means of an inerasable marker in an integrated circuit of the programmable power supply device. The inerasable marker indicating the change of freeze/programmability level, e.g., due to the entering from a current freeze/programmability level to a different freeze/programmability level either with authorization or without authorization, can be understood as a programmability mechanism that indicates the change of freeze/programmability levels without authorization.

In case of a change from a current freeze/programmability level to a lower freeze/programmability level of the programmable power supply device, the marker in an integrated circuit of the programmable power supply device may indicate an unauthorized change or an unauthorized programming. Furthermore, the marker in an integrated circuit of the programmable power supply device may exclude or indicate the name and thus liability of the instance responsible for the previous stage.

According to another embodiment of the present invention the programmable power supply device supports several freeze/programmability levels. In this embodiment, a specific password or marker of the programmable power supply device may be associated with each freeze/programmability level to control the way back to the next lower freeze/programmability level (does not apply for the lowest available freeze/programmability level of the of the programmable power supply device). Alternatively, a specific password or marker of the programmable power supply device may be associated with each freeze/programmability level to control the way back to the next higher freeze/programmability level (does not apply for the highest available freeze/programmability level of the programmable power supply device).

In the following, two of the above proposed operation modes or options of a programmable power supply device according to the present invention are explained in more detail.

As a first option according to the present invention, a higher freeze/programmability level can be entered by a dedicated write command, e.g., "freeze/lock command". In an embodiment of the present invention the freeze/lock command may be send together with a password as a first variable and an optional penalty parameter as a second variable. A lower freeze/programmability level can be entered by a second dedicated command, e.g., "unfreeze/unlock command". According to an embodiment of the present invention the "unfreeze/unlock command" may be send together with the respective password. The correct password for this action may be the password that has been installed with the "freeze/lock command" to enter the higher freeze/programmability level.

If an "unfreeze/unlock command" was sent with an incorrect password a "penalty procedure" configured by the penalty parameter may be commenced. A subsequent penalty handling or procedure may define how much effort is needed in the case a wrong password is sent with the "unfreeze/unlock command" to avoid unauthorized access.

If the "unfreeze/unlock command" is sent by a read transaction, a different information (not the password) may be returned, e.g., the current freeze/programmability level. This avoids reading out the previously installed password. Thus, a manufacturer of a module for a programmable power supply device can protect some parameters by entering a higher freeze/programmability level before shipping the modules to a subsequent manufacturer of a programmable power supply system.

If one or more of the module parameters have to be changed afterwards, the module manufacturer can enter the lower freeze/programmability level again by applying his own password. This modification of the module parameters may be required after the return of the modules from the system manufacturer. The freeze/lock-unfreeze/unlock mechanism can be executed as many times as needed, because the passwords and the freeze/programmability levels can be reprogrammed. Hence, deviating from known techniques the passwords and the freeze/programmability levels are not stored in a one-time programmable memory. According to an embodiment of the present invention the related bits may be stored in a subset of a one-time programmable memory. However, this may limit the number of freeze/lock-unfreeze/unlock cycles or would require a quite big memory. Therefore, in another embodiment of the present invention the related information is stored in a multiple time programmable non-volatile memory (e.g., EEPROM) when using the password mechanism.

As a second option according to embodiments of the present invention, a first number of one or several one-time programmable bits may be used as a first marker and a second number of one or several one-time programmable bits may be used as a second marker. The two markers may define three possible states. For instance, if both markers are not set, this means the freeze/programmability level is unlocked and has never been locked. For instance, if one marker is set, this means the freeze/programmability level has been locked. For instance, if both markers are set, this means the freeze/programmability level has been unlocked again (and was locked before).

According to another aspect of the present invention the markers can only be set but not cleared or erased. For this sake, the markers can only be set once and then always read out from the chip. The usage of one-time programmable markers to unfreeze/unlock can be used for tracking and may be interpreted as a "revision history". In this connection, the one-time programmable markers can be used to analyze frozen devices without knowledge of the passwords, e.g., in case of a failure analysis request (FAR). Thus, the manufacturer may examine warranty issues, if the devices have been used after unfreeze/unlock of the programmable markers, since it can be proven that the password mechanism has been circumvented. The one-time programmable memory may be a PROM, an EPROM, so that a programmed bit cannot be erased by electrical means. Moreover, the one-time programmable memory may be an EEPROM or FLASH or part of an EEPROM or FLASH with a hardware or a software protection preventing the erasing of the program content.

According to another aspect of the present invention each restriction variable may refer to a dedicated stack or one stack is handling all restriction variables in one group, furthermore, both alternatives can be combined. According to an embodiment of the present invention dedicated variables ("restriction variables") and one or more stacks can be specified such that they define the restriction to certain commands and the related parameters. For instance, the dedicated variables can define that one stack is related to one parameter, respectively. According to another embodiment of the present invention the top of a stack represents the most recent set of restriction variables, which can define the allowed range for operating parameters and new restriction variables for the next higher freeze/programmability level. When the next freeze/programmability level is entered, the modified restriction variables for the new freeze/programmability level can be pushed to the stack. Thus, the top of the stack represent the restriction variables that are applied in this freeze/programmability level.

An example for a restriction variable is the data byte of the PMBus standard command WRITE_PROTECT. An example for a restriction set of rules may be as follows:

Write access is allowed only to commands that are not write-protected as defined by the data byte of WRITE_PROTECT;

The data byte of WRITE_PROTECT must be one of the allowed values as defined in the following table:

| Write Protect Data Byte on Top of Stack | Allowed Values for the Data Byte of WRITE_PROTECT |
| --- | --- |
| 00000000b = 00h | 00h, 20h, 40, 80h |
| 00100000b = 20h | 20h, 40h, 80h |
| 01000000b = 40h | 40h, 80h |
| 10000000b = 80h | 80h |

In other examples, other rules may apply.

Another example for a restriction variable is the protection of parameter ranges. Several parameters can to be restricted from one manufacturer stage to the next manufacturer stage to avoid undesired so called "tuning" effects of parameters and to limit the risk of system destruction. Another parameter for useful limiting the risk of system destruction can be the output voltage of a power supply.

For example, the device manufacturer produces a device capable of delivering output voltages in a range of about 0V to 6V to cover the most common applications with one device. The module manufacturer may target 1.5V applications and use external components adapted to the lower voltage range. In such case it is important to protect the device from delivering 6V, since this could cause the destruction the module. With the present invention, the module manufacturer can limit the reachable output voltage range to 2V by entering a higher freeze/programmability level with a restricted parameter range. Thus, the system manufacturer can set the output voltage within a new restricted range of about 0V to 2V.

According to an embodiment of the present invention a plurality of restriction variables can be defined. In this case care should be taken that the restriction rules between top of stack and the restriction variable ensure that the restriction variable does not become less strict by programming within this restriction rule. Examples for restriction variables are given in the present description further below.

According to another embodiment of the present invention the restrictions can be programmed according to the requirements given by each freeze/programmability level. In this manner a significant degree of flexibility can be achieved while at the same time, the risk of destruction is limited. In the lowest freeze/programmability level no entering to a lower freeze/programmability level is possible. This restriction can apply to the unfreeze/unlock command. If the stack comprises an upper limit, a highest freeze/programmability level exists so that an entering into a higher freeze/programmability level is not possible. This restriction can refer to the freeze/lock command. In this connection, it can be useful that the restriction variables are not programmable in this highest freeze/programmability level.

According to an aspect of the present invention a programmable power supply device is provided with:

a number of hierarchically ordered freeze/programmability levels of programmability;

the next higher freeze/programmability level may be entered without a password check, but an additional password or marker has to be installed to allow the way back to the lower freeze/programmability level (authorized by password or tracked by marker);

a freely-programmable password or an inerasable marker mechanism for each freeze/programmability level (except for the lowest one);

an entering of the next lower freeze/programmability level may be:

either authorized (password protection with penalty procedure in case of a wrong password used); or marked (where an inerasable marker is set after entering for tracking purposes); or any combination of authorized and marked entering (e.g., authorized entering for one group of levels, marked entering for another group of levels);

a restriction defined for parameters by variables, a stack, and restriction rules the top of stack restricting the restriction variables;

the restriction variables restricting one or more commands, command parameters, or variables;

restrictions can lead to a reduced programming value range of a parameter or to a completely disabled programming access to a parameter;

depending on the parameter and its usage in the system, the restriction mechanism can be chosen (some parameters may have range restrictions, whereas others can not be modified);

With the present invention an integrated power supply device can be protected against unauthorized unrestricted programming or unauthorized unrestricted programming is inerasably marked in the integrated circuit. The restriction mechanism according to the present invention may also protect against erroneously or unintended modification of parameters.

The integrated circuit may pass through several stages of manufacturing (chip manufacturer, module manufacturer, . . . ) and during each stage the restrictions can be increased in accordance with the present invention. According to an embodiment of the present invention in each manufacturing stage, a new password can be sent to the device when entering the next freeze/programmability level. This mechanism according to the present invention can avoid undesired modification of the internal data.

According to another aspect of the present invention restrictions beyond the PMBus standard command WRITE_PROTECTION can be defined, especially for protection of operation parameters. Automatic password cracking can be made more difficult due to the penalty procedure according to the present invention.

The accompanying drawing is included to provide a further understanding of the present invention and is incorporated in and constitutes a part of this specification. The drawing illustrates an embodiment of the present invention and together with the description serves to explain the principles of the invention. Other embodiments of the present invention and many of the intended benefits of the present invention will be readily appreciated.

In the following description, reference is made to the accompanying drawing, which form a part hereof, and in which is shown by way of illustration specific embodiments in which the invention may be practiced. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

An embodiment of a basic architecture for a programmable power supply device according to the present invention is shown in the accompanying drawing. The FIGURE shows a block diagram that illustrates an embodiment of a basic architecture for a programmable power supply device according to the present invention.

As can be seen from the FIGURE, a programmable power supply according to an embodiment of the invention comprises a "configuration variables for power supply" unit or module. Variables can be changed in the "configuration variables for power supply" unit by another unit or module designated as "command/variable handler". The influences between the units or modules indicated by the double headed arrows and single headed arrows in the FIGURE. Both units the "configuration variables for power supply" unit and the "command/variable handler" unit may communicate with a host controller (not shown in the FIGURE).

A "restriction variable" unit comprises restriction variables that may be stored in registers of the "restriction variable" unit or another suitable memory device. These restriction variables define the restrictions on the commands handled by the "command/variable handler" unit. Restriction variables can define for each command whether the command is accepted and, if the command is accepted, whether any restriction applies. Generally, the power supply device may also accept commands that change the restriction variables and commands that change the freeze/programmability level.

Also these commands can be subject to restrictions defined by the restriction variables. If a freeze/programmability level change command is requested by the host, a unit "change freeze/programmability level" verifies the command and its parameters by means of a "password stack" unit and the current freeze/programmability level. If the verification of the command and its parameters fails, the command is invalid. Reactions against invalid commands can be a rejection or an activation of a penalty marker or violation marker as indicated by the "violation marker" box in the FIGURE.

If a freeze/programmability level change command is valid, the freeze/programmability level is changed as indicated by the "stack" unit in the FIGURE. The "stack" unit comprises restriction variables of different freeze/programmability levels, e.g., N−1, N−2, N−3. Changing of the freeze/programmability level means pushing the current restriction variables into the stack or popping restriction variables from the stack as indicated by the "push/pop" box in the FIGURE. It may also lead to push/pop actions on the password stack as indicated by doubled headed arrow pointing to the "password stack" box in the FIGURE.

The unit "command/variable handler" may provide the interface to a host controller. The freeze/programmability level change commands or the change restriction variables commands handed by the power supply device can be commands defined for module or system manufacturer e.g., PMBus commands as well as commands defined for chip manufacturers e.g., JTAG commands.

In the following further embodiments of the present invention are disclosed, wherein particular details are described with respect to
the restriction variables and restriction rules,
the set of freeze/programmability levels,
the penalty procedure, and
the storage of variables and stacks.

Implementations of the present invention are described with respect to the variables and stacks. According to one embodiment of the present invention a restriction variable is a data byte, word or block of a write protection command. In this case each bit of this variable defines the write protection of a command or a group of commands. A zero bit means that this command is not write protected, a one bit means that this command is write protected. In an alternative embodiment of the present invention one bit means that this command is not write protected, a zero bit means that this command is write protected. A bit in the variable must be one, if the corresponding bit on the top of stack is set to one as well. Thus, the set of write protected commands cannot shrink from stage to stage and a command that was write-protected in one stage keeps write-protected in the following stages.

In general, restriction rules can be defined such that any bit of a data byte word or block that was set and frozen in the previous freeze/programmability level must not be cleared in the current freeze/programmability level or vice versa.

According to another embodiment of the present invention a restriction variable is an upper limit for a numerical data of a command, e.g., the commanded output voltage (VOUT_COMMAND). The command may not be taken into account (PMBus: not acknowledge), if its numerical data is greater than the variable, or its numerical data is not less than the variable than, depending on the type of variable. When a variable like VOUT_COMMAND is accessed in a writing process, it must be less than its corresponding element of the top of the stack. According to another embodiment of the present invention a restriction variable is set by another command.

Similar embodiments of the present invention can be found by defining a lower limit, a numerical data range (from a lower limit to an upper limit), or a finite set of allowed values. Furthermore, the numerical order of the command data byte word or block, any other order can be used for the restriction rule.

As mentioned above, according to the present invention penalty procedure may be provided, for instance, to make password cracking more difficult. One embodiment of the penalty procedure may be as follows: If a wrong password has been entered into the chip or device, the access to the chip or device may be blocked for a certain time period. The time may be set by a penalty parameter. The penalty parameter may represent the penalty time in terms of a pre-defined unit.

Another embodiment of a penalty procedure may be given by the introduction of penalty commands to the chip or device. If the password was wrong the host must repeat the unfreeze or unlock command for a given number of times specified by the penalty parameter. For instance, the penalty parameter can represent the number of repetitions. In another embodiment of the present invention, the unfreeze or unlock command must be repeated with the correct password.

In the following, an implementation for the storage of the variables, i.e. the freeze or programmability level information and the stack are discussed.

According to another embodiment of the present invention the freeze/programmability level information (freeze/programmability level, password, and penalty) is available on the chip or device even after the power supply to the chip or device has been switched off. Therefore, the freeze/programmability level information may be stored in non-volatile memory or in memory of the chip or device with a separate power supply. For instance, the variables can be stored in registers or in volatile RAM with a separate power supply, which may allow a fast reading and writing access. Provided the reading access to the non-volatile memory is fast enough, the variables can also be stored in non-volatile memory ideally close to the stack.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the relevant art that this invention can also be employed in a variety of other applications.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A programmable power supply device with a configurable restriction to programmability of the power supply device, wherein the programmable power supply device comprises a number of freeze/programmability levels, each freeze/programmability level defining a dedicated access restriction to the programmability of the power supply device.

2. The programmable power supply device according to claim 1, wherein each freeze/programmability level defines a dedicated restricted access to the programmability of operational parameters of the programmable power supply device.

3. The programmable power supply device according to claim 1, wherein a higher freeze/programmability level causes a more restricted access to the programmability of operational parameters of the programmable power supply device than a lower freeze/programmability level.

4. The programmable power supply device according to claim 1, wherein the use of the freeze/programmability levels in the operation of the programmable power supply device is liable to a hierarchical order.

5. The programmable power supply device according to claim 1, wherein changing a current freeze/programmability level entering from a current freeze/programmability level to a higher and/or lower freeze/programmability level requires an appropriate authorization.

6. The programmable power supply device according to claim 5, wherein a higher freeze/programmability level with a higher access restriction can be entered by a first dedicated command or freeze/lock command.

7. The programmable power supply device according to claim 6, wherein the freeze/lock command is sent to the programmable power supply device together with a respective password as a first variable required for the entering of a higher freeze/programmability level and an optional penalty parameter as a second variable.

8. The programmable power supply device according to claim 7, wherein a lower freeze/programmability level with a lower access restriction can be entered by a second dedicated command or unfreeze/unlock command.

9. The programmable power supply device according to claim 8, wherein the unfreeze/unlock command is sent to the programmable power supply device together with a respective password required for the entering of a lower freeze/programmability level.

10. The programmable power supply device according to claim 1, wherein a specific password is associated with each freeze/programmability level to control the entering of the freeze/programmability level and/or to control the changing of a current lower freeze/programmability level to a different freeze/programmability level.

11. The programmable power supply device according to claim 10, wherein the password required for the entering of the lower freeze/programmability level is installed in the programmable power supply device with a preceding freeze/lock command to enter a higher freeze/programmability level.

12. The programmable power supply device according to claim 1, wherein, if an unfreeze/unlock command was sent with an incorrect password, a penalty procedure configured by a penalty parameter is initiated, wherein the penalty procedure defines steps to be taken to overcome an unauthorized access.

13. The programmable power supply device according to claim 12, wherein related information for a change of a freeze/programmability level and for freeze/lock cycles or unfreeze/unlock cycles is stored in a non-volatile memory of the programmable power supply device when using the respective passwords.

14. The programmable power supply device according to claim 1, wherein a change of a freeze/programmability level with appropriate authorization is indicated by means of a first programmable marker stored in the programmable power supply device.

15. The programmable power supply device according to claim 14, wherein the change and/or an attempt to change the freeze/programmability level without appropriate authorization is indicated by means of a second programmable marker stored in the programmable power supply device.

16. The programmable power supply device according to claim 15, wherein the first and second programmable markers are unerasably stored in an integrated circuit of the programmable power supply device, the markers indicating the name and liability of an instance responsible for an authorized or an unauthorized change of a freeze/programmability level and/or for an authorized or an unauthorized programming of the programmable power supply device.

17. The programmable power supply device according to claim 16, wherein a third programmable marker indicates that a certain freeze/programmability level is unlocked and/or a certain freeze/programmability level has never been locked.

18. The programmable power supply device according to claim 17, wherein a fourth programmable marker indicates that a certain freeze/programmability level is locked and/or a certain freeze/programmability level has never been unlocked.

19. The programmable power supply device according to claim 18, wherein a fifth programmable marker indicates the history of the changes of freeze/programmability levels and/or freeze/lock cycles and unfreeze/unlock cycles of the programmable power supply device.

20. The programmable power supply device according to claim 19, wherein the first and second programmable markers are used to analyze the history of the changes of freeze/programmability levels and/or freeze/lock cycles and unfreeze/unlock cycles of the programmable power supply device.

21. The programmable power supply device according to claim 1, wherein one or every freeze/programmability level is associated with a certain manufacturer stage of the programmable power supply device.

22. The programmable power supply device according to claim 1, wherein one or every freeze/programmability level is associated with a number of restriction variables defining a dedicated access restriction to the freeze/programmability level, to the programmability of the power supply device and/or to the changing of operational parameters of the programmable power supply device.

23. The programmable power supply device according to claim 22, wherein the restriction variables define access restrictions for certain commands, related parameters, and the protection of operational parameter ranges of the programmable power supply device.

24. The programmable power supply device according to claim 23, wherein one or more of the restriction variables are provided in one or more stacks storing the restriction variables for a current freeze/programmability level and for freeze/programmability levels hierarchically lower than the current freeze/programmability level.

25. A system, comprising a programmable power supply device according to claim 1.

26. A method for operating a programmable power supply device with a configurable restriction to the programmability of the power supply device, wherein programming of the programmable power supply device is restricted according to a number of freeze/programmability levels, each freeze/programmability level defining a dedicated access restriction to the programmability of the power supply device.

27. A control and/or regulatory device, which is arranged and adapted in such a way that it can be used as a control and/or regulatory device for performing the method according to claim 26.

* * * * *